NEGATIVE IMPEDANCE CONVERTERS EMPLOYING TRANSISTORS

Filed Sept. 17, 1952 3 Sheets-Sheet 1

$$Z_N = \frac{Z'_T\,(2Z_d + 2Z_g)}{Z'_T + 2Z_d + 2Z_g}$$

$$Y_N = \frac{Y'_T\left(\frac{1}{2r_e}\right)}{Y'_T + \frac{1}{2r_e}}$$

INVENTORS: J. G. LINVILL
R. L. WALLACE, JR.
BY Harry C. Hart
ATTORNEY

NEGATIVE IMPEDANCE CONVERTERS EMPLOYING TRANSISTORS

Filed Sept. 17, 1952 3 Sheets-Sheet 2

INVENTORS: J. G. LINVILL
R. L. WALLACE, JR.
BY Harry C. Hart
ATTORNEY

IMPEDANCE LOCUS OF FIG. 4

ADMITTANCE LOCUS OF FIG. 5

INVENTORS: J. G. LINVILL
R. L. WALLACE, JR.
BY Harry C. Hart
ATTORNEY

United States Patent Office 2,726,370

Patented Dec. 6, 1955

2,726,370

NEGATIVE IMPEDANCE CONVERTERS EMPLOYING TRANSISTORS

John G. Linvill, Morristown, and Robert L. Wallace, Jr., Plainfield, N. J., assignors to Bell Telephone Laboratories, Incorporated, New York, N. Y., a corporation of New York Application September 17, 1952, Serial No. 310,084

9 Claims. (Cl. 333—80)

This invention relates to impedance conversion and particularly to the conversion of an impedance into the negative counterpart of itself.

General objects of the invention are to simplify the construction, reduce the size, and extend the range of operation of negative impedance converters. A particular object is to reduce the sensitivity of negative impedance converters to fluctuations in the operating or bias voltage with which they are supplied.

Negative impedance converters employing vacuum tubes as their active elements have been described by J. L. Merrill in articles published in the Transactions of the American Institute of Electrical Engineers for 1951, volume 70, part 1, pages 49–54, and in the Bell System Technical Journal for 1951, volume 30, pages 88–109. They also form part of the subject matter of J. L. Merrill Patent 2,582,498, and of an application of J. L. Merrill, Serial No. 191,670 filed October 23, 1950.

Such negative impedance converters are of use in a wide variety of situations in the communications arts. Examples of such uses are described in Merrill Patent 2,582,498, and in articles dealing with negative impedances published by G. Crisson in the Bell System Technical Journal for 1931, volume 10, page 485, and by E. L. Ginzton in Electronics, volume 18, 1945 (July, page 140; August, page 138; and September, page 140).

While the Merrill converters constitute decided advances in the art, they are open to the objection that they are bulky, shortlived, consume much operating power and are sensitive to fluctuations in the operating voltage with which they are supplied. The present invention provides converters each of which employs a transistor or transistors as its active element or elements and which are open to none of these objections. Aside from their ruggedness, small size, low power consumption, and wide range of operation, they are so insensitive to fluctuations of the operating voltage supplied to them that a change in this voltage of as much as 70 per cent results in a change of the negative impedance conversion factor of only 5 per cent.

In general, the converters of the invention may employ a transistor or transistors of any variety and having any value of current multiplication factor $\alpha$. For example, the point contact transistor which forms the subject matter of Bardeen-Brattain Patent 2,524,035 is notable for the high values of current multiplication factor which it exhibits, and by the employment of such a transistor in one of the converters of the invention, a comparatively small positive resistance may be converted into a much larger negative resistance. However, especial advantages of stability, predictability, and proportionality between the positive impedance to be converted and the negative impedance which results from the conversion follow from the employment of a transistor whose current multiplication factor is and remains close to unity under a wide range of conditions.

While a point contact transistor may by the employment of special bias conditions, or by the use of special feedback circuits, be caused to have a current multiplication factor of unity, it is preferred to secure this result by the employment of a transistor in which this characteristic is inherent; i. e., a junction transistor of the type which forms the subject matter of Shockley Patent 2,569,347, or a compound transistor of the type which forms the subject matter of an application of S. Darlington, Serial No. 286,914 filed May 9, 1952, issued as Patent 2,663,806, December 22, 1953.

Transistors of this preferred variety are exceedingly stable in almost every respect, but the collector current of such a transistor contains a component which is subject to variations with temperature. It follows that a negative impedance converter of which such a transistor forms an active element is also subject to temperature variations. In accordance with a subsidiary feature of the present invention, circuit arrangements are provided which operate to desensitize the negative impedance converter from the temperature variations of the transistor which forms a part of this converter.

The invention will be fully apprehended from the following detailed description of preferred embodiments thereof taken in connection with the appended schematic circuit diagrams in which.

Figure 1:
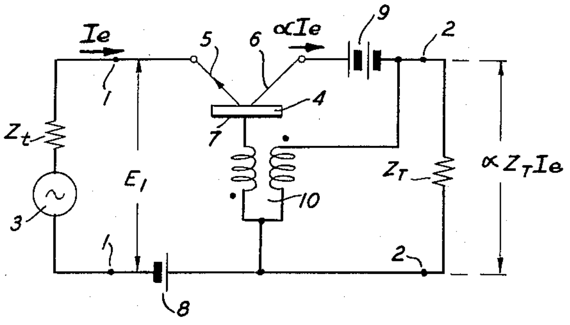
Fig. 1 shows a negative impedance converter of simple form and of open circuit stable type.

Referring now to the drawings, Fig. 1 shows an especially simple negative impedance converter in connection with which the mode of operation of all of the various converters of the invention will be explained. It comprises a translating circuit having input terminals 1—1, to which a signal source 3, associated with an input terminating impedance $Z_t$, may be connected and output terminals 2—2 connected to a terminating impedance element $Z_T$. As its active element, the translating circuit employs a transistor 4 having an emitter 5 connected to one of the input terminals, a collector 6 connected to one of the output terminals and a base 7 which is common to one input terminal and one output terminal. Bias voltages of appropriate magnitude and sign for application to the emitter and the collector respectively may be derived from potential sources 8, 9.

The polarities of the sources 8, 9 are correct for a P-type transistor as indicated by the fact that the arrowhead on the emitter connection points outward. If N-type transistors were to be employed, this would be indicated by an inwardly pointing arrowhead on the emitter connection 5 and both of the bias potential sources 8, 9 would be reversed in sign.

In addition to the foregoing elements, which are stereotyped in the amplifier art, a transformer 10 is provided with its primary winding connected to the output terminals 2 and its secondary winding connected in series between the base connection 7 and the common terminals 1, 2. Its polarity, as indicated by the conventional dots, is such that its output voltage is in phase opposition to its input voltage.

The manner in which the circuit of Fig. 1 operates as a negative impedance converter may be simply explained as follows: Suppose a signal current $I_e$ flows into the emitter connection 5. Then, in accordance with the well-known behavior of transistors, a collector current whose magnitude is very nearly $\alpha I_e$ flows out of the collector connection 6, where $\alpha$ is the current multiplication factor of the transistor 4. Disregarding, for the moment, any current drawn by the primary winding of the transformer 10, this current flows through the terminating impedance $Z_T$ and produces a voltage drop across it given by $$\alpha Z_T I_e$$

A fraction $\beta$ of this voltage, namely, a voltage of the magnitude $$\beta\alpha Z_T I_e$$

is fed back into the emitter circuit in series with the signal source 3 and with the phase reversal secured by the manner in which the transformer windings are poled.

Now, it is characteristic of transistors generally that the potential difference between the emitter connection 5 and the base connection 7 is small; in other words, that only a small voltage drop exists across the input terminals 5, 7 of the transistor proper. From this, it follows that the total voltage appearing at the input terminals 1—1 of the circuit as a whole is closely equal to the voltage fed back by way of the transformer 10, namely $$E_1 = -\beta\alpha Z_T I_e \quad (1)$$

Therefore, dividing by the current $I_e$, there results for the input impedance $$Z_1 = \frac{E_1}{I_e} = -\beta\alpha Z_T \quad (2)$$

In other words, the input impedance, as seen at the input terminals 1—1 of the circuit is equal to the negative of the terminating impedance $Z_T$, increased (or diminished), by a conversion factor $\beta\alpha$.

The foregoing simplified explanation disregards two considerations, namely, the current drawn by the primary winding of the transformer 10 and any current which may flow in the base connection 7 of the transistor 4. With respect to the first approximation, it is well known that, at least within a specified operating range, a transformer may be constructed whose performance approximates that of an ideal transformer exceedingly closely. Therefore, the current drawn by the primary winding of the transformer 10 is not a serious source of error in the foregoing explanation.

The current flowing through the base connection 7 of the transistor, if it exists, produces a voltage drop across the secondary winding of the transformer 10 and so reduces the accuracy of the foregoing explanation. However, and in accordance with a feature of the invention, this base current may be rendered negligibly small by the employment of a transistor which is characterized by a current multiplication factor $\alpha$ whose value is very close to unity; i. e., its collector current is almost exactly equal to its emitter current, wherefore its base current is virtually zero. Notable among transistors having this property are the P–N junction transistors described in Shockley Patent 2,569,347. Techniques for fabricating such units are described by Teal, Sparks and Buehler in the Physical Review for February 15, 1951, vol. 81, page 637, and in an application of G. K. Teal, Serial No. 168,184, filed June 15, 1950. Refinements of such transistors and techniques for introducing them are described in an application of S. Darlington, Serial No. 286,914, filed May 9, 1952.

With such a transistor, i. e., one having a current multiplication factor which is substantially equal to unity, the foregoing explanation adheres very closely to the facts and, the value of $\alpha$ being now unity, the input impedance of the circuit becomes $$Z_1 = -\beta Z_T \quad (3)$$

The generality introduced by employing a transformer whose voltage ratio, determined by its turns ratio and given by $\beta$, differs widely from unity is of small practical interest. It serves to furnish a converter which converts a small positive impedance into a large negative one or vice versa. As a practical matter, a converter whose conversion factor is substantially unity is in most cases sufficient and in some cases an advantage. Therefore, it is preferable to select the turns ratio of the transformer 10 solely from the standpoint that it exactly compensates for any departure of the transistor current multiplication factor from unity; i. e., $$\beta\alpha = 1 \quad (4)$$

With this change the impedance seen at the input terminals 1—1 becomes simply $$Z_1 = -Z_T \quad (5)$$

By an explanatory argument which at each point is dual to the foregoing explanation, it can be shown that the admittance presented by the network at its terminals 2—2 is the negative of the terminating admittance $Z_t$ connected to its terminals 1—1. In other words, the external action of the converter of Fig. 1 is fully bilateral. Internally, however, the action is different in that the transformer now acts as a "feed-forward" element; i. e., it feeds energy applied at the collector terminals 2—2 to the transistor base, with reversal of phase.

Transistors can now be fabricated whose current amplification factors are so closely equal to unity, and whose base currents are therefore so negligible that their translation capabilities are comparable with those of electromagnetic transformers.

Figure 2:
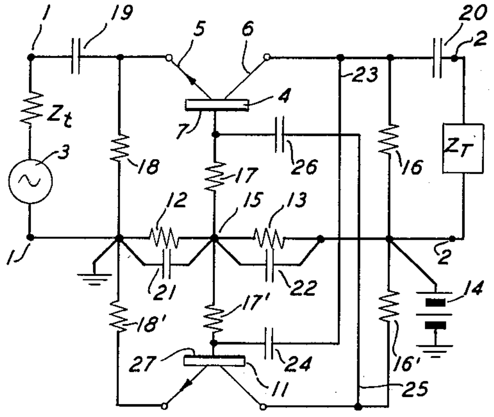
Fig. 2 shows an extension of Fig. 1.

Therefore, in accordance with another feature of the invention, the transformer 10 of Fig. 1 may itself be replaced by a transistor selected to give an output-input current ratio of unity and so connected in the circuit as to introduce its output voltage on the base connection of the working transistor and with a phase reversal. Fig. 2 shows such a circuit in which the biasing potential sources have been replaced by a pair of resistors 12, 13 connected between ground and the positive terminal of a single potential source 14 whose negative terminal is grounded. The base connection 7 of the working transistor 4 is connected to the common terminal 15 of these two resistors 12, 13 and the relative magnitudes of these resistors are selected to apply bias voltages of appropriate magnitudes to the emitter 5, the base 7, and the collector 6 of the transistor 4, respectively. Appropriate operating potentials are applied to the collector connection 6, to the base connection 7 and to the emitter connection 5 by way of resistors 16, 17, 18. Input terminals 1, 1 are connected to ground and, by way of a blocking condenser 19, to the emitter electrode 5 while output terminals 2, 2 are connected to ground and, by way of a blocking condenser 20, to the collector connection 6. A terminating impedance $Z_T$ is connected to the output terminals 2, 2 and a signal source 3 is connected to the input terminals 1, 1. The power supply resistors 12, 13 may be bypassed for signal frequencies by condensers 21, 22.

A second or phase shifting transistor 11 is shown in the lower half of the figure. It may be of the same variety as the upper transistor 1 and therefore may operate with the same bias voltages. Thus its emitter, base and collector are connected to the same points of the power supply resistors 12, 13 as are the corresponding electrodes of the working transistor 4. Furthermore, these connections may be made by way of similar resistors 16', 17', 18'.

The output voltage of the working transistor 4 is applied by way of a lead 23 and a blocking condenser 24 to the phase shifting transistor 11. This application is not immediately to the emitter electrode of the phase shifting transistor, but to its base electrode 27. When an input signal is applied to the base electrode of the transistor, the potential of its emitter being maintained or permitted to follow the base potential, this signal is translated in its collector circuit with a reversal of phase. The phase-reversed output voltage of the auxiliary transistor 11 is now applied by way of a lead 25 and a blocking condenser 26 to the base connection 7 of the first transistor 4. This voltage is supported by the resistor 17 and operates precisely in the fashion described above in connection with Fig. 1 for the voltage fed back from the collector circuit to the transistor base by the phase-inverting transformer 10.

Straightforward analysis shows that in this case the feedback factor, which corresponds to the turns ratio of the transformer 10 of Fig. 1, is equal to the ratio of the parallel resistance of the upper base resistor 17 and the lower collector resistor 16′ to the lower emitter resistor 18′, multiplied by the alpha of the lower transistor; i. e., it is given by $$\beta=\alpha\frac{\dfrac{R_{17}R'_{16}}{R_{17}+R'_{16}}}{R'_{18}} \qquad (6)$$

For a negative conversion factor of $-1$, this feedback factor is to be selected in accordance with Equation 4; i. e.

$$\alpha\beta=\alpha^2\frac{\dfrac{R_{17}R'_{16}}{R_{17}+R'_{16}}}{R'_{18}}=1 \qquad (4a)$$

If for any reason it is desired to increase this factor without upsetting the transistor electrode bias conditions, a portion of the resistor $R'_{18}$ may be shunted by a bypass condenser.

Figure 3:
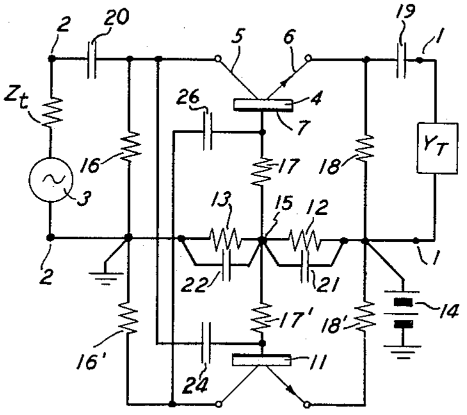
Fig. 3 shows a modification of Fig. 2 which is of the short circuit stable type.

Given a negative impedance converter whose characteristics are as described above, and given that the source and the terminating impedance are connected as shown in Fig. 2, the circuit is stable when its emitter terminals 1—1 are open. Fig. 3 shows a short-circuit stable negative impedance converter. It is structurally identical with Fig. 2, except for the fact that the source 3 and the terminating impedance, now treated as an admittance $Y_T$, have been interchanged as between the emitter terminals 1—1 and the collector terminals 2—2.

These reciprocal stability considerations are discussed by G. Crisson in the Bell System Technical Journal for July 1931, volume 10, page 485. They are further discussed in J. L. Merrill Patent 2,582,498.

Figs. 1, 2, and 3 are single-sided or unbalanced circuits. In Figs. 2 and 3, one of the two unbalanced terminals is in each case connected to ground.

The invention is readily extended to balanced or push-pull circuits. Thus, the requirements on a transistor to make it serve as the working transistor of the unbalanced negative impedance converter are substantially identical with the requirements on a transistor to serve as a phase inverter. Accordingly, it is convenient to employ like units for the converting transistor 4 and the inverting transistor 11 of Figs. 2 and 3 and to provide them with like operating voltages by way of like bias circuits. Such provision results in the fact that, except for the location of the input and output terminals, the structures of Figs. 2 and 3 are symmetrical. Accordingly, merely by the relocation of the emitter and collector terminals, the single sided converter of Fig. 2 becomes a balanced or push-pull converter of the open circuit-stable variety shown in Fig. 4. Similarly, merely by the relocation of the emitter and collector terminals of Fig. 3, it becomes a balanced or push-pull converter of the short circuit-stable variety shown in Fig. 5.

Figure 4:
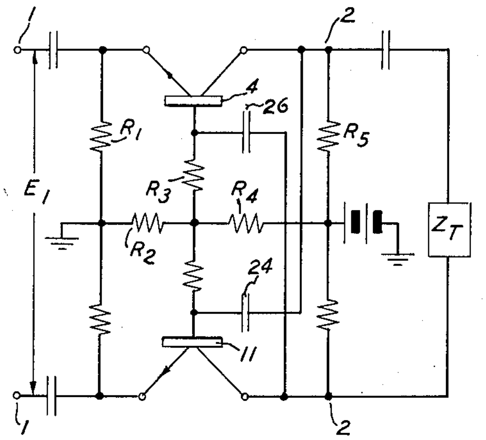
Fig. 4 shows a push-pull negative impedance converter of the open circuit stable type.
Figure 5:
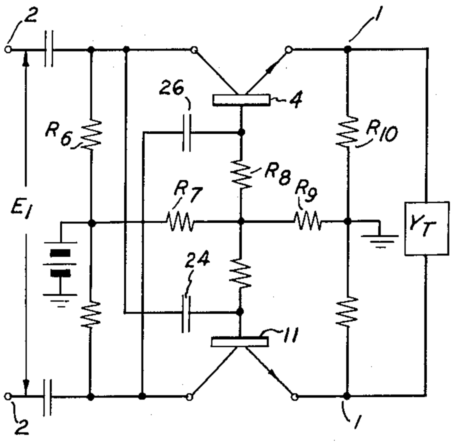
Fig. 5 shows a push-pull negative impedance converter of the short circuit stable type.

In accordance with practices which are well known in the vacuum tube amplifier art, the condensers 21, 22 which, in the unbalanced circuits of Figs. 2 and 3, served to bypass the power supply resistors 12, 13 for signal frequencies become unnecessary in the balanced or push-pull circuits of Figs. 4 and 5 and are accordingly omitted.

The simplified explanation given above in connection with Fig. 1 may be extended to the balanced converter of Fig. 4. However, to examine in detail the extent to which the performance of such a converter may depart from the ideal, an analysis of the circuit as it stands may be performed. This analysis has been carried out with the assistance of the equivalent circuit diagram of Fig. 6 in which two simplifications are made as compared with the complete circuit of Fig. 4. First, the resistors $R_1$ connected across the emitter terminals 1—1 which serve to supply operating bias current to the emitters are omitted from Fig. 6. This is tantamount to disregarding their shunting effect; that is, to treating them as of effectively infinite resistance. This simplification is entirely proper because such resistors in practice are normally of large magnitude compared with others in the circuit and because, even apart from this, they merely shunt the converter as a whole, rather than modifying its performance internally. Second, the resistors $R_5$ which are connected across the collector terminals 2, 2 and supply collector bias currents are likewise omitted from Fig. 6. These resistors, too, are normally relatively large so that their shunting effect is small. If greater precision is desired, the terminating impedance $Z'_T$ of Fig. 6 may be regarded as a composite of the parallel impedance of these supply resistors and the terminating impedance $Z_T$ of Fig. 4.

Figure 6:
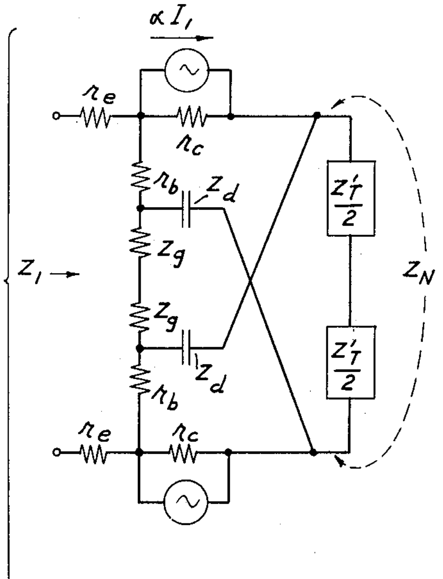
Fig. 6 shows a simplified equivalent circuit of the converter of Fig. 4.

With these simplifications, and with the single approximation that the collector resistance $r_c$ of each transistor 4, 11 is large compared with the terminating impedance $Z_T$ of the converter so that the latter is negligible in comparison with the former, a straightforward circuit analysis of Fig. 6 yields, for the input impedance $Z_1$ the following expression:

$$\frac{E_1}{I_1}=-\alpha Z_N\frac{Z_g}{Z_g+Z_d}+2r_e+(1-\alpha)\left[2r_b+\frac{(2Z_d+Z'_T)2Z_g}{2Z+Z_T+2Z_g}\right] \qquad (7)$$

where the various quantities have the meanings indicated on Fig. 6.

With the further approximation that the coupling condensers operate merely to isolate bias potentials and interpose no substantial impedance at signal frequencies, i. e., $$Z_d\to 0$$

and $$\frac{E_1}{I_1}=(1-2\alpha)Z_N+2r_e+(1-\alpha)2r_b \qquad (8)$$

The only approximation made in arriving at the above relations is that $Z_T/r_c$ is negligible, a very good approximation for practical circuits with a load in the thousands of ohms, as $r_c$ is normally of the order of megohms.

Since the current multiplication factors of good junction transistors lie in the range 0.95 to 1.0, the multiplier of $Z_N$ in Eq. 2 is close to the ideal value of $-1.0$. The deviation of the input impedance from $-Z_N$ associated with the second and third terms of Eq. 8 is small also; $r_e$ is inversely proportional to emitter current being 13 ohms at 2 milliamperes, and the third term is a few per cent of $r_b$ whose normal magnitude is a few hundred ohms.

Figure 8:
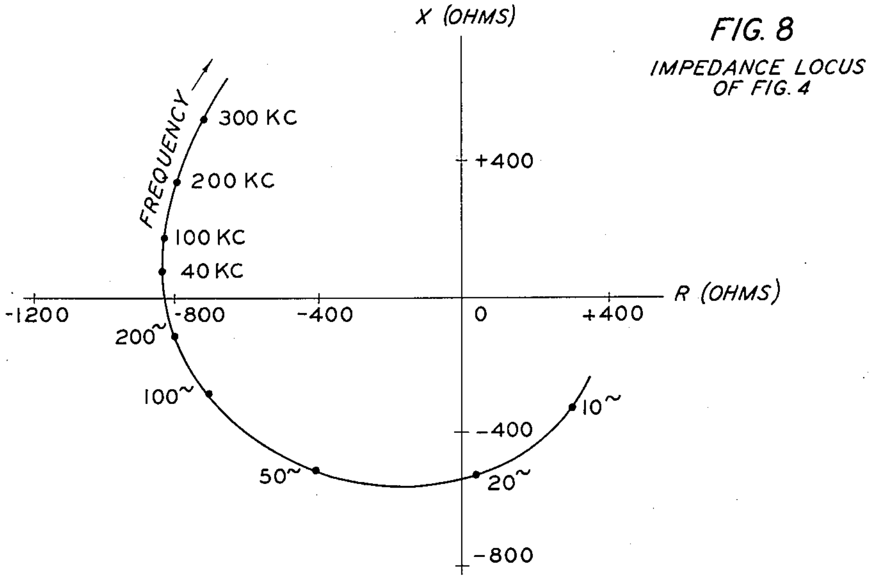
Fig. 8 is a plot of the input impedance, at various frequencies, of the converter of Fig. 4 with particular values for its circuit elements and its termination.

Fig. 8 shows the locus of the input impedance of the converter of Fig. 4 when a terminating resistance of 1140 ohms is connected to its output terminals, its internal element values being as follows:

| | |
|---|---|
| $r_e$=25 ohms | $R_3$=5600 ohms |
| $r_b$=200 ohms | $R_4$=4500 ohms |
| $r_c$=2 megohms | $R_5$=5000 ohms |
| $\alpha$=0.98 | $C_1$=1 microfarad |
| $R_1$=5600 ohms | $Z_T$=1140 ohms |
| $R_2$=4000 ohms | $E_B$=72 volts |

The circuit being symmetrical, oppositely located elements have like magnitudes.

It will be observed from Fig. 8 that the input impedance is a negative complex number throughout a very wide range of frequencies, and that in the center of this range, namely at the frequencies of interest, its negative resistance component far outweighs its reactance component.

The principal course for the frequency variation of the input impedance is that the alpha of the transistor is itself frequency-dependent, varying roughly according to the relation $$\alpha=\frac{\alpha_0}{1+jf/f_{c\alpha}} \quad (9)$$

where $f_{c\alpha}$ is known as the "alpha cut-off frequency." The cutoff frequency of the transistors embodied in the converters for which Fig. 8 was plotted is 1.75 megacycles per second.

The fact that the input impedance locus, Fig. 8, of the circuit of Fig. 4 encircles the origin in the clockwise sense with increasing frequency confirms the fact that the circuit is open-circuit stable. Open-circuit stability is a characteristic of any converter in which the emitter terminals are treated as the input points of the converter, independent of the nature of the passive load or of the internal cross-coupling networks employed.

Figure 7:
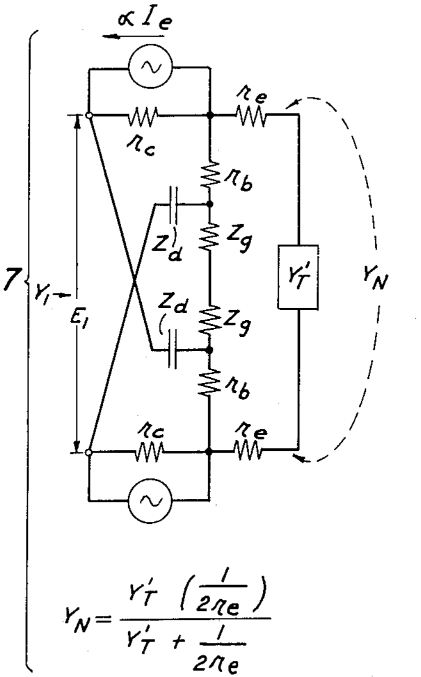
Fig. 7 shows a simplified equivalent circuit of the converter of Fig. 5.

Fig. 7 is an equivalent circuit diagram of the short-circuit stable converter of Fig. 5. In setting it up, the same simplifications are made as in the case of Fig. 6. Straightforward analysis of Fig. 7 yields, for the input admittance of the converter of Fig. 5

$$\frac{I_1}{E_1}=\frac{-\alpha Y_N+\frac{1}{2Z_g}+(1-\alpha)\left(1+\frac{r_b}{Z_g}\right)Y_N}{1+\frac{Z_d}{Z_g}+(1-\alpha)Y_N\left[2r_b+\frac{Z_d}{Z_g}(2r_b+2Z_g)\right]} \quad (10)$$

wherein the various quantities have the meanings assigned to them in Fig. 7.

From this equation it is evident that the ideal performance of the short-circuit stable converter is given by the first term in the numerator, namely $$\frac{I_1}{E_1}=-\alpha Y_N\doteq -Y_T \quad (11)$$

and that deviations from this ideal are small and of different nature from those of the open circuit stable converter.

Figure 9:
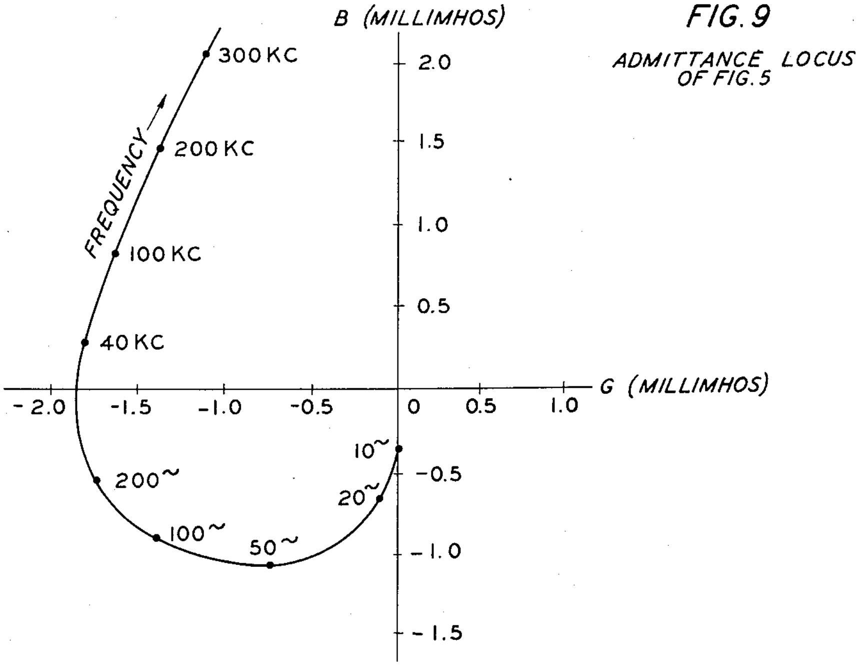
Fig. 9 is a plot of input admittance, at various frequencies, of the converter of Fig. 5 with particular values for its elements and its termination.

Fig. 9 is a plot of the admittance of the short-circuit stable converter of Fig. 5 when the terminating impedance connected to its output terminals has the magnitude 430 ohms and the various internal elements have the following values:

| | |
|---|---|
| $r_e$=25 ohms | $R_8$=5600 ohms |
| $r_b$=200 ohms | $R_9$=12,000 ohms |
| $r_c$=2 megohms | $R_{10}$=2200 ohms |
| $\alpha$=0.98 | $C_Z$=1 microfarad |
| $R_6$=2200 ohms | $Y_T$=1/430 mhos |
| $R_7$=14,500 ohms | $E_B$=45 volts |

The circuit being symmetrical, oppositely located elements have like magnitudes.

It will be observed from the locus of Fig. 9 that the admittance is a negative complex number over a very wide range of frequencies and that throughout the center portion of this range, namely, at the frequencies of principal interest, its negative conductance component greatly outweighs its susceptance component. Furthermore, the fact that the locus encircles the origin of coordinates in the clockwise sense for increasing frequency confirms the short circuit stability of the converter. Indeed, it may be shown that any converter of the type shown in Fig. 5 is characterized by short circuit stability when terminated with a pure resistance and that this is independent of the nature of the passive cross-coupling networks within the converter provided that the magnitude of the alpha of the transistors remains less than unity. It is also a fact that such a converter is inherently stable on short circuit for any passive terminating impedance provided that the alpha of the transistors is a real number and less than unity.

*Overload considerations*

Another point of interest for the converters of the invention is found in connection with their overload characteristics. With the converter of the open circuit stable type of Fig. 4, as the signal level is increased, its negative input resistance increases. With the short circuit stable converter of Fig. 5, as the signal level is increased, its negative input conductance decreases. Thus, in each case the circuit is safeguarded against any tendency which overloading might otherwise have to produce self-oscillation.

The design for maximum undistorted power output for converters is similar to that used in designing class A pentode amplifiers. In both cases the power output is limited by the allowable quiescent dissipation which, for the transistor, is $V_cI_c$, $V_c$ and $I_c$ being the quiescent collector voltage and current. In the converter the amplitude of incremental voltages and currents for the input terminals, the output terminals and the collectors of the transistors are practically the same. Hence for distortion-free operation the maximum magnitudes of the A.-C. components of voltage and current at all of the points are $V_c$ and $I_c$. The quiescent operating point is determined by the allowable dissipation, $V_cI_c$, and the load impedance, $V_c/I_c$. The maximum power available at the input terminals, half of the allowable dissipation of a transistor, is 25 milliwatts for the P–N junction transistor. Actually, part of this power is lost in the biasing resistors at the input terminals. Circuits have been constructed which provided powers out as high as 17 milliwatts.

*Design to minimize temperature sensitivity*

Figure 10:
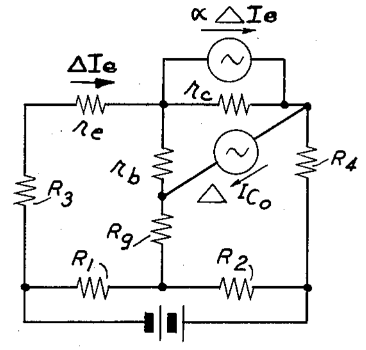
Fig. 10 is an equivalent circuit diagram of assistance in explaining how temperature dependence of the converters of the invention may be minimized.

Junction transistors are not greatly influenced by changes in temperature, except in one respect. The collector current which flows in the absence of emitter current, $I_{co}$, is extremely temperature-sensitive. Proper design of converter circuits can make its effect on circuit performance small. At room temperatures $I_{co}$ ordinarily amounts to a few microamperes. For junction transistors, the change in $I_{co}$ from room temperature to 150 degrees Fahrenheit is normally less than 100 microamperes. The effect of increased $I_{co}$ is to decrease the maximum power output by decreasing the amount of signal which leads to distortion. In some circuits the changes in $I_{co}$ are amplified and very greatly reduce the maximum undistorted power output. Analysis of the equivalent circuit of Fig. 10 with the two pessimistic approximations, $r_c=\infty$, $\alpha=1$, gives the following relations.

$$\Delta I_e\cong\Delta I_{co}\frac{R_g+\frac{R_1R_2}{R_1+R_2}}{R_3+r_e} \quad (12)$$

and $$\Delta V_c\cong -\Delta I_{co}\left[R_g+\frac{R_1R_2}{R_1+R_2}+R_4\left(1+\frac{R_g+\frac{R_1R_2}{R_1+R_2}}{R_3+r_e}\right)\right] \quad (13)$$

On the basis of Eqs. 12 and 13 to minimize variations in the point of operation, the ratio $$\frac{R_g+\frac{R_1R_2}{R_1+R_2}}{R_3+r_e} \quad (14)$$

should be kept to a small value.

The change in $I_c$ of a few hundred microamperes obtained when the above ratio is a few units is still a small fraction of the normal quiescent collector current which is a few milliamperes.

The converter of the invention, in any of its forms, especially those of Figs. 2, 3, 4, and 5, when appropriately terminated with a positive impedance in the fashion described above, thus presents a stable and reliable negative impedance at its input terminals. It follows that the combination of such a converter and its termination may be employed, for example, as a telephone line repeater, operating power being supplied to it over the telephone line. A converter of the open-circuit stable variety is of course to be connected in series with the line and one of the short-circuit stable variety in parallel with it.

When so employed, the converters of the invention offer decided advantages as compared with presently available converters. Aside from their small size and compactness of form, ruggedness, long life, and low power requirements, they are especially notable for their insensitivity to fluctuations in the operating voltage. As compared with converters employing vacuum tubes as their active elements, this insensitivity is traceable to several causes. First, the parameters of the vacuum tube in which the action of available converters originates, depend for their magnitude on the operating voltages supplied to its anode and its grid. The parameters of the transistor, notably its alpha, are much less closely dependent on the emitter and collector biases. Such bias voltage dependency as does exist is further reduced by the power supply circuits of the invention which operate to hold substantially fixed the ratio of collector bias to emitter bias, even though these quantities fluctuate individually over wide ranges. Most important of all, each parameter of the vacuum tube departs from its nominal value with every change in filament or heater current; and this dependency has no counterpart in the transistor.

In the circuits of Figs. 1–5, it will readily be understood that, if desired, certain of the power supply resistors may be replaced by choke coils, and also that the source 3 and the terminating network $Z_T$ may be coupled to one pair of terminals of the converter by way of a transformer and that the terminating network $Z_T$ may be coupled to the other pair of converter terminals by way of another transformer.

The above-described arrangements are illustrative of the application of the principles of the invention. Other arrangements may be devised by those skilled in the art without departing from the spirit and scope of the invention.

What is claimed is:

1. A negative impedance converter which comprises a transistor having a semiconductive body, emitter, base and collector connections to said body, means including an electric energy source connected for biasing said emitter in a forward direction and said collector in a reverse direction, a first pair of terminals of which one is connected to the emitter connection and the other is connected to a common point, a first terminating network interconnecting said first pair of terminals, a second pair of terminals of which one is connected to the collector connection and the other is connected to said common point, a second terminating network interconnecting said second pair of terminals, an impedance element connected between said base connection and said common point, means for deriving a signal proportional to the voltage appearing at said second pair of terminals, means for inverting the phase of said signal, and means for applying said phase-inverted signal to said impedance element, whereby the impedance presented by either pair of said terminals is negatively related to the impedance of the terminating network connected to the other pair of terminals.

2. Apparatus as defined in claim 1 wherein a voltage appearing at said second terminal pair is fed back to said impedance element.

3. Apparatus as defined in claim 1 wherein a voltage appearing at said second terminal pair is fed forward to said impedance element.

4. Apparatus as defined in claim 1 comprising also a transformer having a primary winding and a secondary winding and wherein the impedance element connected to the base connection is constituted substantially by the secondary winding of said transformer, the primary winding of said transformer being connected to said second pair of terminals, and wherein said phase inversion is produced by the polarity of the transformer windings.

5. Apparatus as defined in claim 1 wherein the transistor is selected from a group characterized by a current multiplication factor whose value is very close to unity.

6. In combination with apparatus as defined in claim 1, means for changing the magnitude of said phase-inverted signal before application to said impedance element by a factor $\beta$ and wherein the product $\beta\alpha=1$, $\alpha$ being the current multiplication factor of the transistor.

7. Apparatus as defined in claim 1 wherein said signal phase inverting means comprises a second transistor.

8. A negative impedance converter which comprises a principal transistor having a semiconductive body, emitter, base, and collector connections to said body, a source of operating potential for said transistor having a low potentional end terminal, a high potential end terminal, and an intermediate tap, a first terminating network interconnecting said emitter connection with one of said end terminals, a second terminating network interconnecting said collector connection with the other of said end terminals, an impedance element $R_{17}$ interconnecting said base connection with said tap, an auxiliary transistor having a semiconductive body, emitter, base, and collector connections to said body, a resistor $R'_{18}$, interconnecting one of said end terminals with the emitter of said auxiliary transistor, a resistor $R'_{16}$, interconnecting the other of said end terminals with the collector of said auxiliary transistor, another impedance element interconnecting the base of said auxiliary transistor with said intermediate tap, a connection from the collector of each of said transistors to the base of the other, said resistors being proportioned in accordance with the relation $$\alpha^2 \frac{\dfrac{R_{17}R'_{16}}{R_{17}+R'_{16}}}{R'_{18}}=1$$

where $\alpha$ is the current multiplication factor of the transistor.

9. A balanced push-pull negative impedance converter which comprises a pair of like transistors, each of which has a semiconductive body and emitter, base, and collector connections to said body, means including an electric energy source connected for biasing said emitters in a forward direction and said collectors in a reverse direction, an impedance element having one end connected to the base connection of one of said transistors, a second impedance element having one end connected to the base connection of the other of said transistors, the free ends of said elements being connected together, a first pair of terminals connected respectively to the emitter connections of said transistors, a first terminating network interconnecting said first pair of terminals, a second pair of terminals connected respectively to the collector connections of said transistors, a second terminating network interconnecting said second pair of terminals, and a low-impedance path interconnecting the collector connection of each transistor with the base connection of the other transistor, whereby the impedance presented by either pair of said terminals is negatively related to the impedance of the terminating network connected to the other pair of terminals.

References Cited in the file of this patent

UNITED STATES PATENTS

| | | |
|---|---|---|
| 2,569,347 | Shockley | Sept. 25, 1951 |
| 2,582,498 | Merrill | June 15, 1952 |

OTHER REFERENCES

"Duality as a Guide in Transistor Circuit Design," Wallace and Raisbeck Bell System Telephone Journal, vol. XXX, pp. 381–418, April 1951.